(12) United States Patent
Tachi et al.

(10) Patent No.: US 10,804,776 B2
(45) Date of Patent: Oct. 13, 2020

(54) BONDED-MAGNET INJECTION MOLDING DEVICE AND BONDED-MAGNET INJECTION MOLDING METHOD

(71) Applicant: JTEKT CORPORATION, Osaka-shi, Osaka (JP)

(72) Inventors: Koji Tachi, Kariya (JP); Hiroshi Yoshikawa, Kadoma (JP); Naotake Kanda, Okazaki (JP); Taiki Takeuchi, Okazaki (JP); Shohei Ogi, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 247 days.

(21) Appl. No.: 15/951,513

(22) Filed: Apr. 12, 2018

(65) Prior Publication Data

US 2018/0309351 A1  Oct. 25, 2018

(30) Foreign Application Priority Data

Apr. 20, 2017 (JP) ................... 2017-083663

(51) Int. Cl.
  *H02K 15/03*  (2006.01)
  *H02K 1/27*   (2006.01)
  (Continued)

(52) U.S. Cl.
  CPC ......... *H02K 15/03* (2013.01); *B29C 45/0001* (2013.01); *B29C 45/0046* (2013.01);
  (Continued)

(58) Field of Classification Search
  CPC ...... H02K 15/03; H02K 15/12; H02K 1/2706; H02K 1/2766; H02K 1/2773;
  (Continued)

(56) References Cited

U.S. PATENT DOCUMENTS

2016/0126792 A1   5/2016  Yamaguchi et al.

FOREIGN PATENT DOCUMENTS

EP    1 176 700 A2    1/2002
EP    3 101 786 A1   12/2016
      (Continued)

OTHER PUBLICATIONS

Oct. 1, 2018 Extended European Search Report issued in European Patent Application No. 18167505.9.

*Primary Examiner* — Peter Dungba Vo
*Assistant Examiner* — Azm A Parvez
(74) *Attorney, Agent, or Firm* — Oliff PLC

(57) ABSTRACT

An injection molding device includes: a lower die that supports a rotor core; an intermediate die including a magnetizing mechanism; and an upper die including an injection die having a gate formed therein through which a molten bonded-magnet material supplied from a supply source is injected into a magnet insertion hole in the rotor core. The injection die has a cylindrical protruding portion at an end surface of which the gate is open. In the protruding portion, a magnetic-flux applying member containing ferromagnetic material is embedded with its side surface exposed at an outer peripheral surface of the protruding portion. The magnetizing mechanism is formed in an annular shape that can accommodate, inside its inner periphery, the rotor core and a distal end portion of the protruding portion by disposing yokes and permanent magnets alternately in the circumferential direction. Magnetic-path surfaces of the yokes radially face the side surface.

3 Claims, 5 Drawing Sheets

(51) Int. Cl.
*H02K 15/12* (2006.01)
*B29C 45/27* (2006.01)
*B29C 45/00* (2006.01)

(52) U.S. Cl.
CPC ...... *B29C 45/2703* (2013.01); *B29C 45/2708* (2013.01); *H02K 1/2706* (2013.01); *H02K 1/2766* (2013.01); *H02K 1/2773* (2013.01); *H02K 15/12* (2013.01); *B29K 2995/0008* (2013.01)

(58) Field of Classification Search
CPC ............ B29C 45/0001; B29C 45/0046; B29C 45/2703; B29C 45/2708
USPC ........................................ 29/598, 596, 592.1
See application file for complete search history.

(56) References Cited

FOREIGN PATENT DOCUMENTS

| | | | | | |
|---|---|---|---|---|---|
| JP | 2014036488 A | * | 2/2014 | ............ | H02K 15/03 |
| JP | 2016-093091 A | | 5/2016 | | |

* cited by examiner

BONDED-MAGNET INJECTION MOLDING DEVICE AND BONDED-MAGNET INJECTION MOLDING METHOD

INCORPORATION BY REFERENCE

The disclosure of Japanese Patent Application No. 2017-083663 filed on Apr. 20, 2017 including the specification, drawings and abstract, is incorporated herein by reference in its entirety.

BACKGROUND OF THE INVENTION

1. Field of the Invention

The present invention relates to a bonded-magnet injection molding device and a bonded-magnet injection molding method.

2. Description of Related Art

As a rotor of a dynamoelectric machine in a related art, what is called a magnet-embedded rotor is known in which a permanent magnet is embedded in a rotor core to be fixed thereto. For a permanent magnet of such a magnet-embedded rotor, a bonded magnet may be used from a viewpoint of its high degree of flexibility in shape, for example. Such a bonded magnet is molded by injecting, into a magnet insertion hole formed in the rotor core, a bonded-magnet material obtained by combining a molten resin material with a magnetic material in powder form, as described in Japanese Patent Application Publication No 2016-93091 (JP 2016-93091 A), for example.

Specifically, an injection molding device described in JP 2016-93091 A includes a lower die, an intermediate die, and an upper die. The lower die supports the rotor core. The intermediate die has a magnetizing mechanism. The upper die is connected to a supply source of the bonded-magnet material. The magnetizing mechanism is formed in an annular shape that can accommodate a rotor inside its inner periphery. The magnetizing mechanism applies a magnetic flux to the rotor core from the outer peripheral side, thereby magnetizing a bonded-magnet material injected into a magnet insertion hole in the rotor core. In the upper die, a gate through which a molten bonded-magnet material supplied from the supply source is injected is arranged at a position facing an outer peripheral portion of the rotor core, that is, a position close to an inner peripheral surface of the magnetizing mechanism. Because of this arrangement, the bonded-magnet material is injected into a range with a strong magnetic field that is close to the inner peripheral surface of the magnetizing mechanism, and is accordingly magnetized by the strong magnetic flux. Thus, the orientation rate and the magnetization rate of the molded bonded magnet can be increased.

However, recently, there has been an increasing number of requests for higher output torque of a motor, and accordingly the number of requests for improving the magnetization rate of a bonded magnet has been increasing. Thus, a new technique that enables magnetization of a bonded magnet at a higher level has been desired. The number of requests for improving the magnetization rate of a bonded magnet is increasing for cases not only when the bonded magnet is used for rotors but also for other applications.

SUMMARY OF THE INVENTION

One object of the present invention is to provide a bonded-magnet injection molding device and a bonded-magnet injection molding method that enable improvement of the magnetization rate of a bonded magnet.

A bonded-magnet injection molding device according to one aspect of the present invention, as a structural feature thereof, includes an injection die in which a gate through which a molten bonded-magnet material is injected into a hollow portion in a target object is formed. The injection die is provided with a magnetic-flux applying unit that applies a magnetic flux into the gate.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
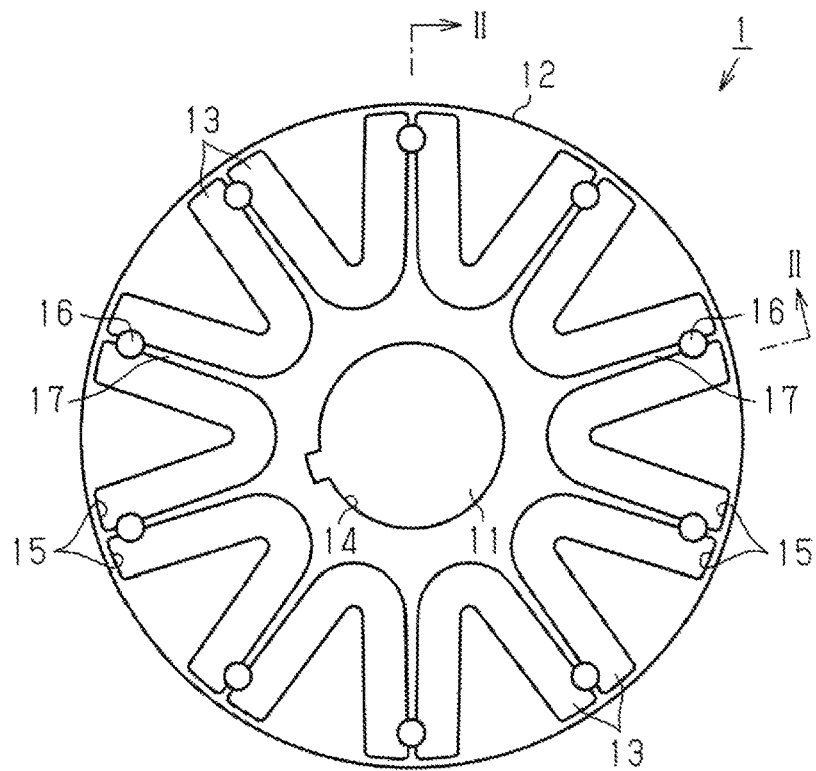
FIG. 1 is a plan view of a rotor.
Figure 2:
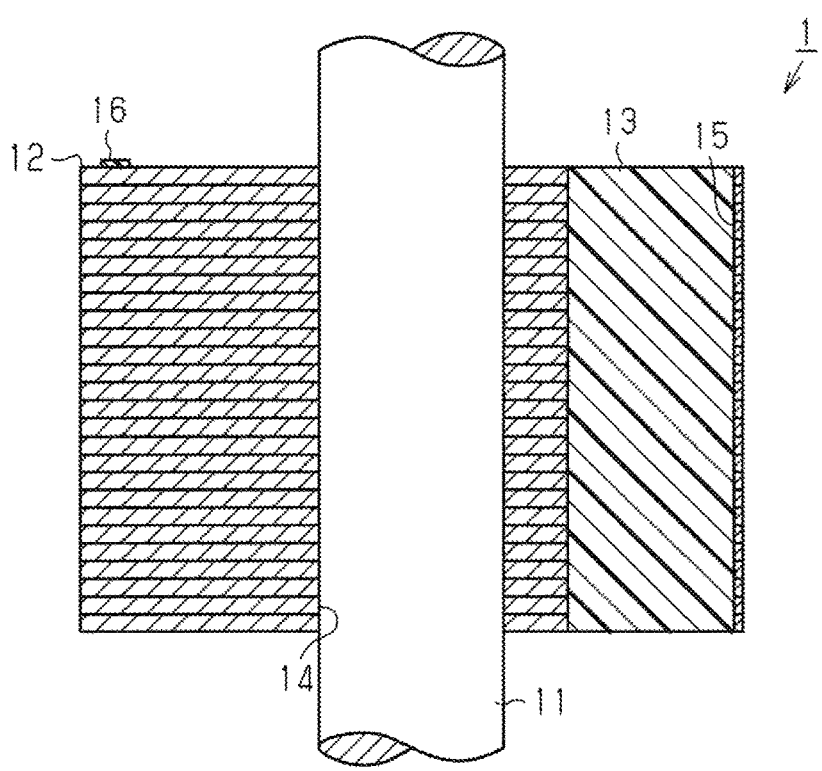
FIG. 2 is a sectional view of the rotor (sectional view taken along line II-II in FIG. 1)

One embodiment of a bonded-magnet injection molding device and a bonded-magnet injection molding method is described below with reference to the drawings. A rotor 1 illustrated in FIG. 1 and FIG. 2 is rotatably disposed inside an inner periphery of a stator (not illustrated). For example, the rotor 1 constitutes a motor (dynamoelectric machine) that is a drive source of an electric power steering system.

The rotor 1 includes a rotor core 12 and a plurality of bonded magnets (e.g., plastic magnets or rubber magnets) 13. The rotor core 12 is fixed to a rotating shaft 11 so as to be integrally rotatable. The bonded magnets 13 are embedded in the rotor core 12 to be fixed thereto. In other words, the rotor 1 of the present embodiment is configured as what is called a magnet-embedded rotor.

Specifically, the rotor core 12 is configured by stacking a plurality of magnetic steel sheets to form a columnar shape. A shaft hole 14 passes through the center of the rotor core 12 in the axial direction. The rotating shaft 11 is press-fitted into the shaft hole 14 such that the rotor core 12 and the rotating shaft 11 are integrally rotatable. In the rotor core 12, a plurality of (10 in the present embodiment) magnet insertion holes 15 are formed as hollow portions in which the bonded magnets 13 are disposed. Each magnet insertion hole 15 passes through the rotor core 12 in the axial direction. The cross-section of each magnet insertion hole 15 is formed in an arc shape protruding radially inward.

Each bonded magnet 13 is formed in a curved plate-like shape such that its cross-section has an arc shape that fits the magnet insertion hole 15. On one end surface of each bonded magnet 13 in the axial direction, a gate mark 16 is formed that is a shear mark made when a gate 77 is separated after a molten bonded-magnet material is injected by an injection molding device 21 described later. In the present embodiment, each gate mark 16 is, on one end surface of the rotor core 12 in the axial direction, positioned at a spoke portion 17 formed between adjacent magnet insertion holes 15, and is formed over radially outer end portions of the corresponding two adjacent bonded magnets 13. The respective bonded magnets 13 are magnetized along the thickness direction such that polarities generated at an outer periphery of the rotor 1 are alternately reversed along the circumferential direction.

The following describes manufacture of the rotor, focusing on injection molding and magnetization of the bonded magnets 13.

Figure 3:
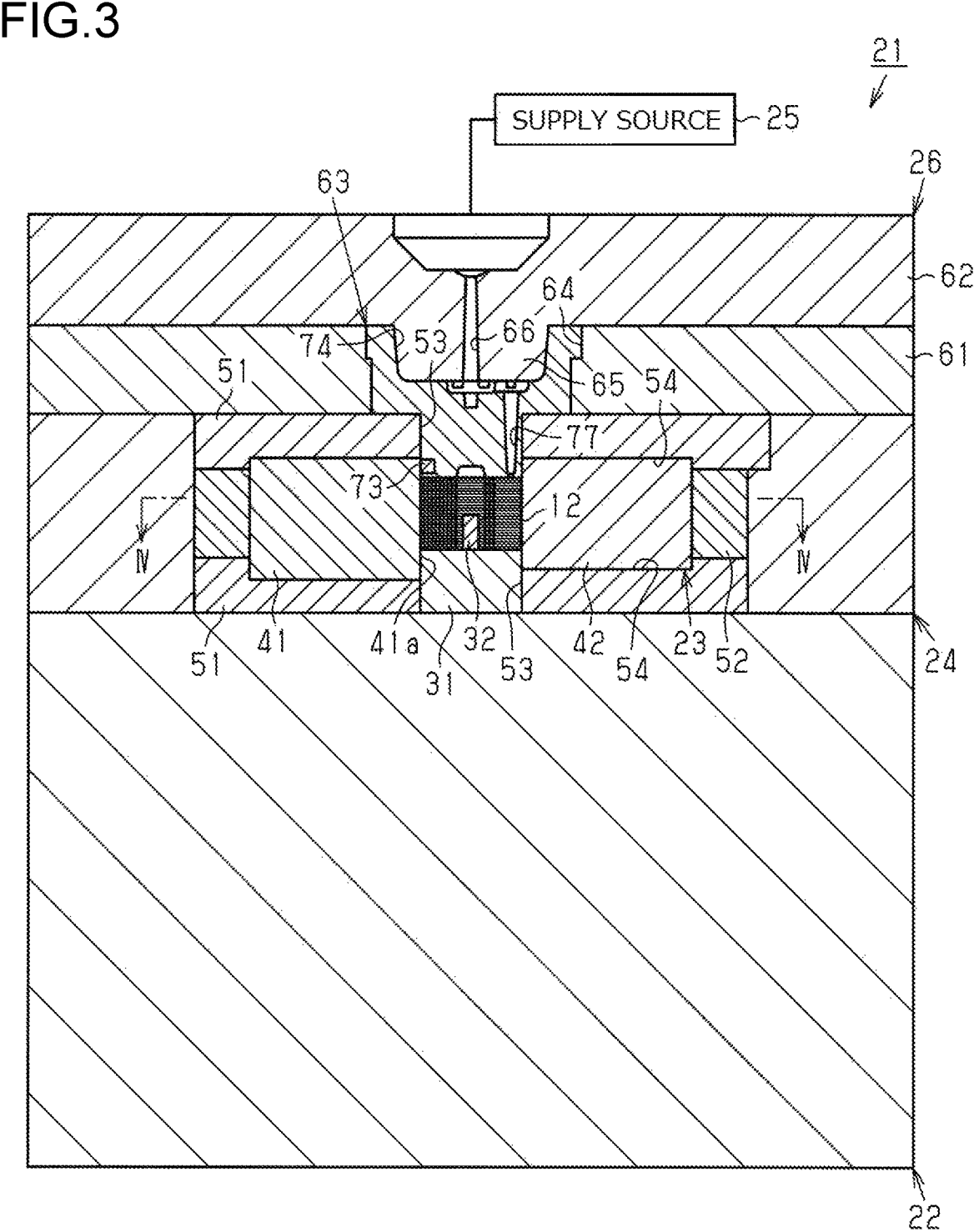
FIG. 3 is a sectional view illustrating a schematic configuration of a bonded-magnet injection molding device.

As illustrated in FIG. 3, the injection molding device 21 for the bonded magnets 13 includes a lower die 22, an intermediate die 24, and an upper die 26. The lower die 22 supports the rotor core 12. The intermediate die 24 includes an annular magnetizing mechanism 23. The upper die 26 is connected to a supply source 25 of a bonded-magnet material obtained by combining a molten resin material with a magnetic material in powder form. The lower die 22 and the intermediate die 24 are configured as movable dies that can be integrally moved with respect to the upper die 26.

The lower die 22 is a block-like structure made by joining together a plurality of thick metal plates. A cylindrical base portion 31 is provided on the center of an upper surface of the lower die 22. A positioning rod 32 protrudes from the center of an upper surface of the base portion 31. The outside diameter of the base portion 31 is set to be substantially the same as the outside diameter of the rotor core 12. The positioning rod 32 is formed such that its cross-sectional shape is substantially the same as the cross-sectional shape of the shaft hole 14 in the rotor core 12. When the bonded magnets 13 are injection molded, the positioning rod 32 is inserted into the shaft hole 14 in the rotor core 12. This allows the rotor core 12 to be placed on the base portion 31 such that the outer peripheral surface of the rotor core 12 is flush with the outer peripheral surface of the base portion 31.

Figure 4:
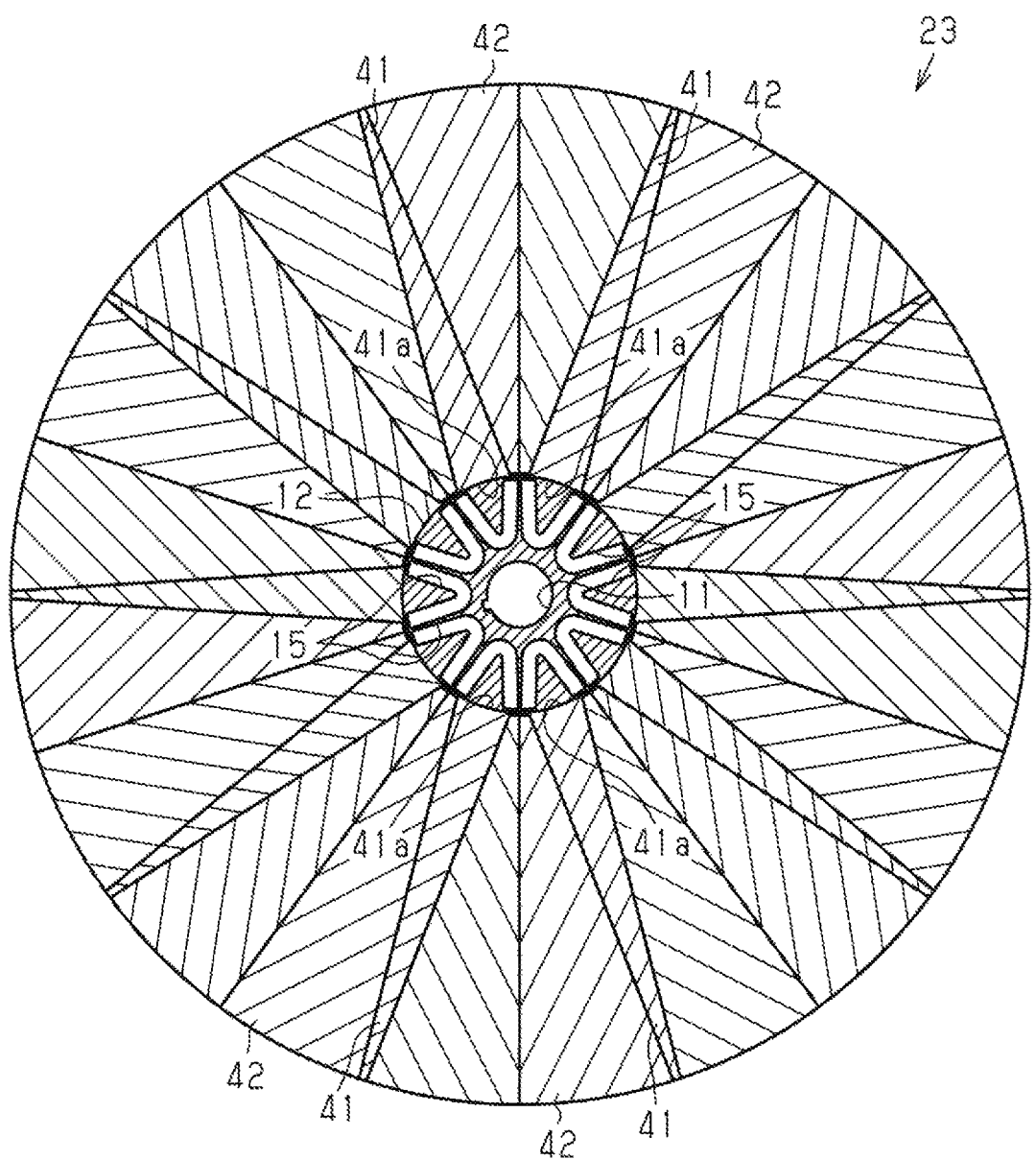
FIG. 4 is a sectional view of a magnetizing mechanism (sectional view taken along line IV-IV in FIG. 3)

As illustrated in FIG. 3 and FIG. 4, the magnetizing mechanism 23 of the present embodiment is formed in an annular shape by arranging a plurality of (10 in the present embodiment) yokes 41 and a plurality of (10 in the present embodiment) permanent magnets 42 alternately in the circumferential direction.

Specifically, each yoke 41 is made of ferromagnetic material such as iron, and is formed in a columnar shape such that its cross-section has a substantially trapezoidal shape that is long and slender. The length of each yoke 41 along the axial direction (upper-and-lower direction in FIG. 3) is set longer than the axial length of the rotor core 12. A magnetic-path surface 41a corresponding to a lower edge of a trapezoid formed by the cross-section of each yoke 41 is a curved surface having an arc shape the curvature radius of which is substantially the same as that of the outer peripheral surface of the rotor core 12. The respective yokes 41 are arranged at regular angular intervals in an annular shape such that the magnetic-path surfaces 41a are positioned radially inside and are in contact with the outer peripheral surface of the rotor core 12 or face the outer peripheral surface of the rotor core 12 with a minute clearance therebetween.

The cross-section of each columnar permanent magnet 42 has the shape of a sector corresponding to a space between adjacent yokes 41. Each permanent magnet 42 is made by joining together magnet pieces corresponding to equal halves into which the sector formed by the permanent magnet 42 is divided at its circumferential center. The length of each permanent magnet 42 along the axial direction is set longer than the axial length of the rotor core 12. The inner peripheral surface of each permanent magnet 42 is formed in a planar shape or in a curved surface shape having a curvature radius slightly larger than that of the magnetic-path surface 41a of the yoke 41, and is positioned radially outside the magnetic-path surface 41a. The outer peripheral surface of each permanent magnet 42 has a curvature radius that is substantially the same as that of a side surface of each yoke 41 positioned radially outside, and forms a smooth cylindrical surface integrally with the yoke 41. The respective permanent magnets 42 are arranged substantially orthogonal to contact surfaces with the rotor core 12, and are magnetized alternately in the circumferential direction such that each yoke 41 is sandwiched by the same polarities from both sides in the circumferential direction.

Figure 5:
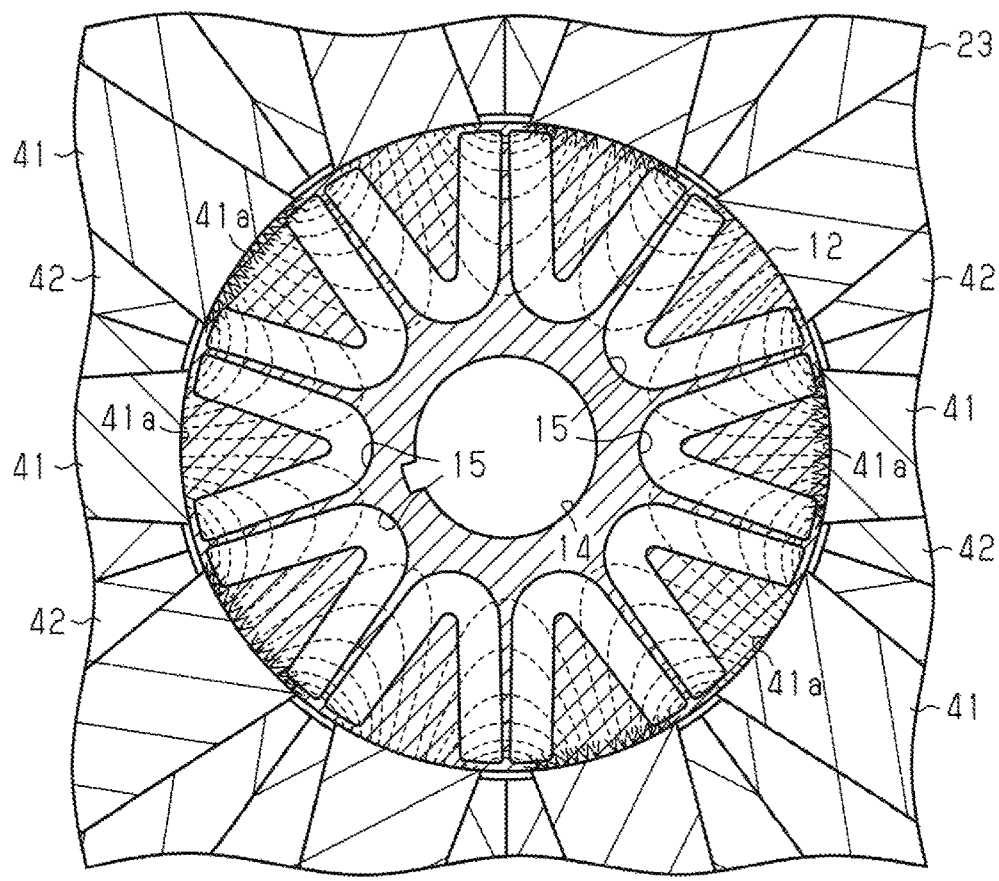
FIG. 5 is a schematic diagram illustrating flows of magnetic fluxes applied to a rotor core by the magnetizing mechanism.

Thus, as illustrated in FIG. 5, a magnetic flux of each permanent magnet 42 forms a magnetic path extending from the magnetic-path surface 41a of a yoke 41, passing through the rotor core 12 (adjacent magnet insertion holes 15), and returning to the magnetic-path surface 41a of a yoke 41 disposed adjacently to the yoke 41.

As illustrated in FIG. 3, the intermediate die 24 includes a pair of retainer plates 51 and a coupling member 52 disposed between the retainer plates 51. A through hole 53 is formed in the center of each retainer plate 51. An accommodating recess 54 having the shape of a circular hole is formed concentrically with the through hole 53. The bore diameter of each through hole 53 is set to be substantially the same as the outside diameter of the base portion 31 of the lower die 22, and the axial length of each through hole 53 is set shorter than the axial length of the base portion 31 of the lower die 22. The outside diameter of the accommodating recess 54 is set to be substantially the same as the outside diameter of the magnetizing mechanism 23. The coupling member 52 is formed in an annular shape such that its bore diameter is substantially the same as the outside diameter of the accommodating recess 54. The magnetizing mechanism 23 is held using bolts (not illustrated), for example, to couple the respective retainer plates 51 to the coupling member 52, with the accommodating recesses 54 of the respective retainer plates 51 facing each other, an end portion of the magnetizing mechanism 23 being inserted into the accommodating recesses 54, and the coupling member 52 being sandwiched therebetween.

The intermediate die 24 is assembled to the lower die 22 such that a distal end portion of the base portion 31 is inserted inside the inner periphery of the magnetizing mechanism 23 via the through hole 53 in one of the retainer plates 51. In a state in which the intermediate die 24 is assembled to the lower die 22 in this manner, an end portion of the magnetizing mechanism 23 on the lower die 22 side (lower side in FIG. 3) in the axial direction radially faces the base portion 31, an axially central portion of the magnetizing mechanism 23 radially faces the entire rotor core 12, and an end portion of the magnetizing mechanism 23 on the upper die 26 side (upper side in FIG. 3) in the axial direction radially faces a protruding portion 72 of an injection die 63 described later.

Figure 6:
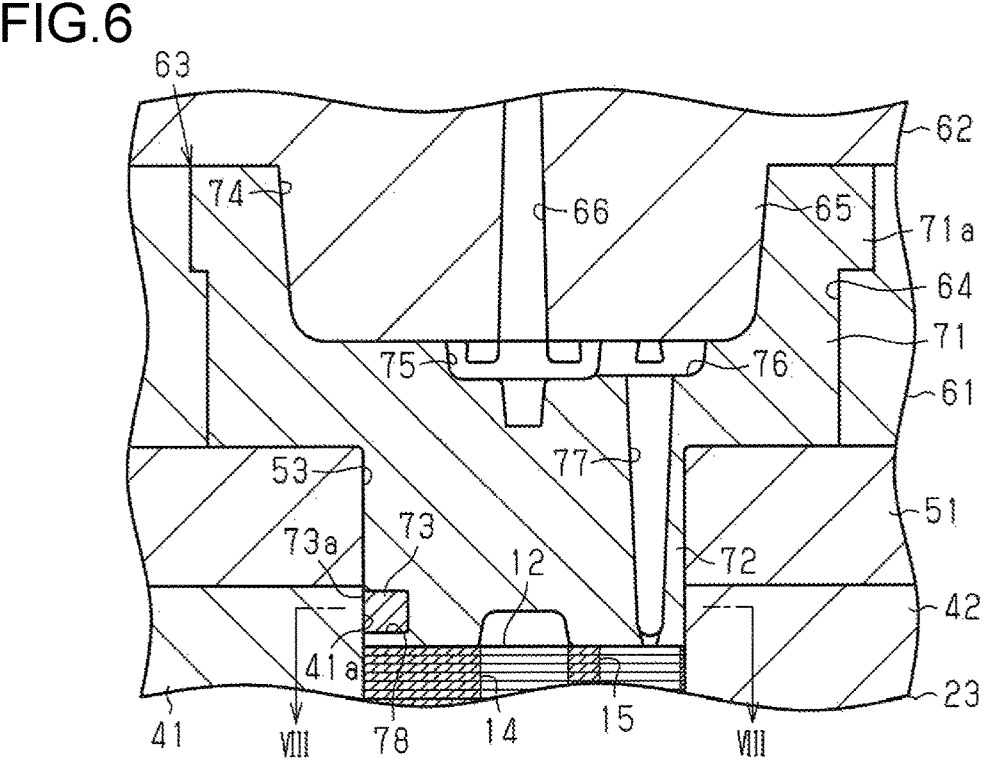
FIG. 6 is an enlarged sectional view of the bonded-magnet injection molding device near an injection die.

As illustrated in FIG. 3 and FIG. 6, the upper die 26 includes a first upper die 61, a second upper die 62, and the injection die (sprue bush) 63. The injection die 63 is assembled to the first upper die 61 to inject a bonded-magnet material. The first upper die 61 and the injection die 63 are configured to be integrally movable with respect to the second upper die 62.

The first upper die 61 is formed in the shape of a thick plate, and is assembled to the intermediate die 24. A fitting hole 64 passes through the first upper die 61 in the thickness direction. The injection die 63 is fitted into the fitting hole 64. The fitting hole is 64 formed in the shape of a stepped circular hole the bore diameter of which decreases toward the intermediate die 24 (toward the lower side in FIG. 3). The fitting hole 64 of the present embodiment is formed such that its cross-sectional shape on the second upper die 62 side (upper side in FIG. 3) is a shape of a circle from which a part is cut off at opposite sides to have edges parallel to each other. The second upper die 62 is formed in the shape of a thick plate. The second upper die 62 is connected to the supply source 25. In the second upper die 62, a cylindrical channel forming protrusion 65 protruding into the fitting hole 64 is formed, and also a supply channel 66 that is open at the center of an end surface of the channel forming protrusion 65 and serves as a flow channel for a molten bonded-magnet material is formed. The supply channel 66 is formed in a tapered shape that linearly extends and the bore diameter of which increases toward the end surface of the channel forming protrusion 65.

Figure 7:
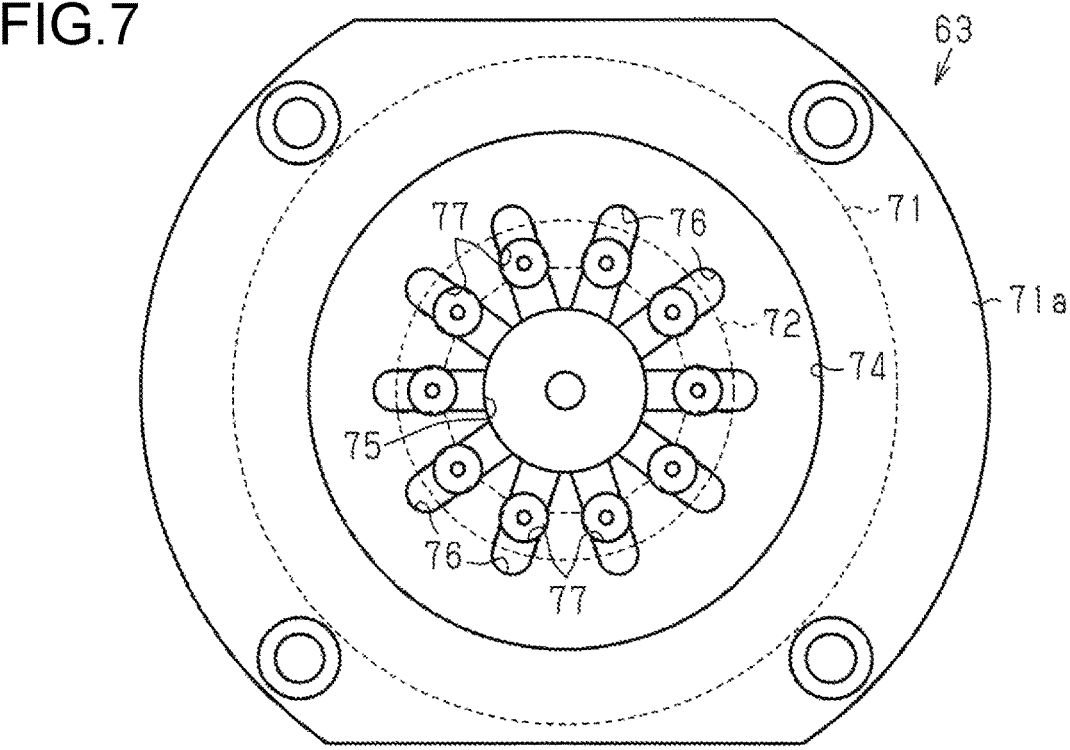
FIG. 7 is a plan view of the injection die.

As illustrated in FIG. 6 and FIG. 7, the injection die 63 is made of non-magnetic material such as stainless steel. The injection die 63 has a cylindrical fitting portion 71, a cylindrical protruding portion 72, and a plurality of (10 in the present embodiment) magnetic-flux applying members 73 as a magnetic-flux applying unit. The protruding portion 72 is arranged concentrically with the fitting portion 71.

The fitting portion 71 has a flange portion 71a protruding radially outward, thus forming a stepped shape such that the outer peripheral surface of the fitting portion 71 fits the inner peripheral surface of the fitting hole 64. The injection die 63 is assembled to the first and second upper dies 61 and 62, with the fitting portion 71 fitted into the fitting hole 64 from the second upper die 62 side (upper side in FIG. 3) and the protruding portion 72 protruding toward the intermediate die 24 side (lower side in FIG. 3). A channel forming hole 74 is formed in the fitting portion 71 such that the channel forming protrusion 65 is fitted into the channel forming hole 74. In the bottom surface of the channel forming hole 74, a flow channel recess 75 having the shape of a circular hole is formed in its center, and also a plurality of (10 in the present embodiment) flow channel grooves 76 extending radially from the flow channel recess 75 are formed. The respective flow channel grooves 76 are formed at regular angular intervals in the circumferential direction. In each flow channel groove 76, a gate 77 that extends in the axial direction and is open at an end surface of the protruding portion 72 is formed at a position close to the outer periphery of the protruding portion 72. Each gate 77 is formed in a tapered shape that linearly extends and the bore diameter of which decreases toward the end surface of the protruding portion 72. Thus, with the channel forming protrusion 65 fitted into the channel forming hole 74, flow channels of a bonded-magnet material are formed that communicate with the respective gates 77 from the supply channel 66 through the flow channel recess 75 and the corresponding flow channel grooves 76.

The outside diameter of the protruding portion 72 is set to be substantially the same as the outside diameter of the rotor core 12, that is, the bore diameter of the through hole 53 in each retainer plate 51. The length of the protruding portion 72 in the axial direction (protruding length from the first upper die 61) is set longer than the axial length of the through hole 53 in the retainer plate 51, and thus the protruding portion 72 is in contact with an end surface of the rotor core 12 in the axial direction. Thus, the distal end portion of the protruding portion 72 is inserted into the magnetizing mechanism 23 with the upper die 26 assembled to the intermediate die 24. The outer peripheral surface of the protruding portion 72 is flush with the outer peripheral surface of the rotor core 12. The distal end portion of the protruding portion 72 is in contact with the magnetic-path surface 41a of each yoke 41 or radially faces the magnetic-path surface 41a with a minute clearance therebetween. In a distal end portion on the outer peripheral surface of the protruding portion 72, a plurality of (10 in the present embodiment) fixing holes 78 that are open in the radial direction are formed between the gates 77. Each fixing hole 78 is formed in the shape of a sector the radial depth of which is slightly greater than the radial distance from the outer peripheral surface of the protruding portion 72 to each gate 77.

Figure 8:
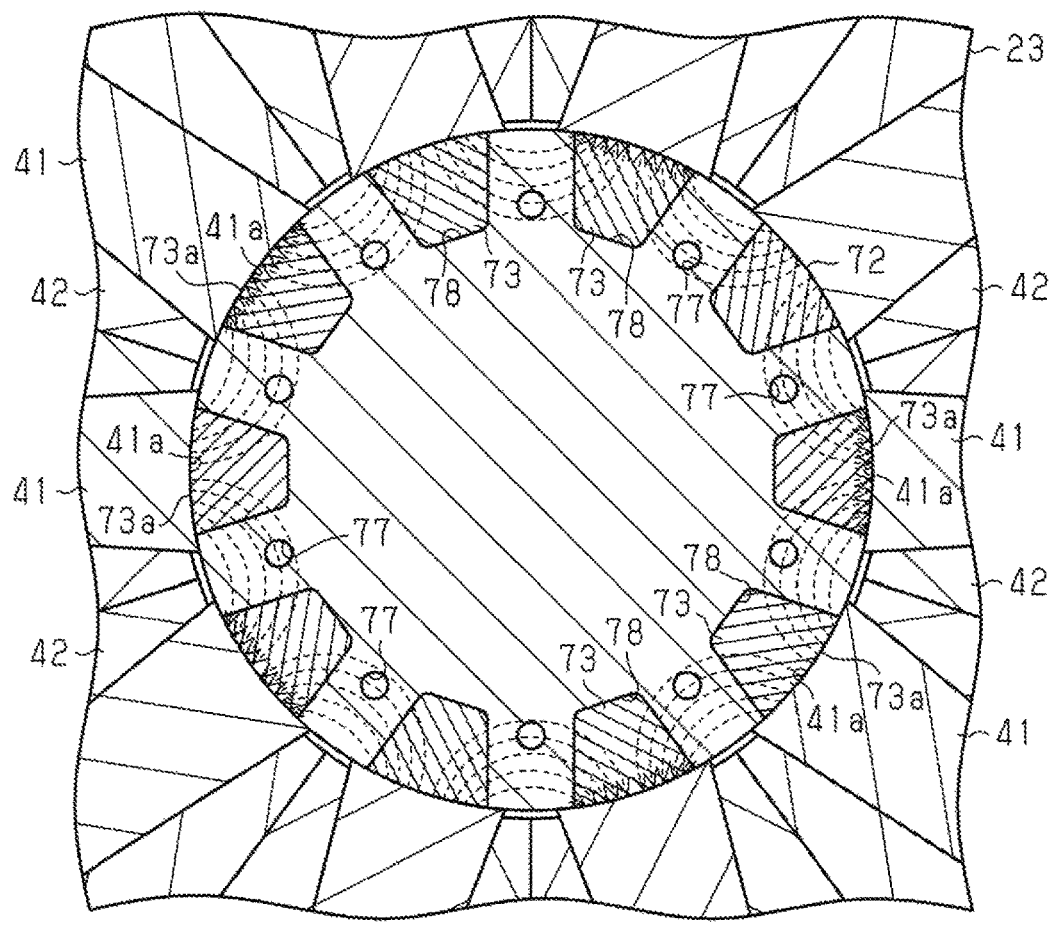
FIG. 8 is a schematic diagram illustrating flows of magnetic fluxes applied to the injection die by the magnetizing mechanism (sectional view taken along line VIII-VIII in FIG. 6).

As illustrated in FIG. 8, each magnetic-flux applying member 73 contains ferromagnetic material such as iron, and is formed in the shape of a sector that fits the hole shape of the corresponding fixing hole 78. Each magnetic-flux applying member 73 is fixed in the corresponding fixing hole 78 by press-fitting or welding, for example. Thus, the respective magnetic-flux applying members 73 are embedded in the protruding portion 72 in a manner sandwiching each gate 77 from both sides in the circumferential direction. A side surface 73a of each magnetic-flux applying member 73 that is exposed at the outer periphery of the protruding portion 72 radially faces the magnetic-path surface 41a of the corresponding yoke 41.

Thus, a magnetic flux of each permanent magnet 42 forms a magnetic path extending from the magnetic-path surface 41a of a yoke 41, entering a magnetic-flux applying member 73 of the injection die 63, passing through a magnetic-flux applying member 73 adjacent to the magnetic-flux applying member 73 via a gate 77, and returning to the magnetic-path surface 41a of a yoke 41 adjacent to the yoke 41.

The following describes a method for manufacturing the rotor, focusing on injection molding and magnetization of the bonded magnets 13 performed by the injection molding device 21. The rotor core 12 manufactured in another process is inserted into the magnetizing mechanism 23, and the rotor core 12 is placed on the base portion 31 such that the positioning rod 32 is inserted into the shaft hole 14. Subsequently, as illustrated in FIG. 3, the lower die 22 and the intermediate die 24 are moved to be assembled to the upper die 26. Accordingly, the protruding portion 72 of the injection die 63 is inserted into the magnetizing mechanism 23, and the magnetic-flux applying members 73 radially face the yokes 41. In this state, the magnetic-flux applying members 73 apply magnetic fluxes into the gates 77 (see FIG. 8) as described above.

A bonded-magnet material is supplied from the supply source 25, and is injected into the magnet insertion holes 15 in the rotor core 12 from the gates 77. When passing through the gates 77, the bonded-magnet material is oriented and magnetized by the magnetic fluxes passing through inside the gates 77. Subsequently, the bonded-magnet material is injected into the magnet insertion holes 15 and, also when moving inside the magnet insertion holes 15, the bonded-magnet material is gradually cured while being oriented and magnetized also by the magnetic fluxes that are generated by the magnetizing mechanism 23 and pass through the magnet insertion holes 15. The bonded-magnet material is then molded in the shapes of the magnet insertion holes 15 to form the bonded magnets 13 (see FIG. 5).

After the molding of the bonded magnet 13, the lower die 22 and the intermediate die 24 are separated from the upper die 26 such that the rotor core 12 is removed. The rotating shaft 11, for example, is assembled to the rotor core 12, whereby the rotor 1 is manufactured. In the present embodiment, when the rotor core 12 is removed, the first upper die 61 and the second upper die 62 are separated, and bonded magnets remaining in the flow channels and cured therein are removed together.

As described above, according to the present embodiment, the following functional effects can be obtained.

(1) The injection die 63 is provided with the magnetic-flux applying members 73 that apply magnetic fluxes into the gates 77, and is configured to, in injection molding of the bonded magnets 13, inject a molten bonded-magnet material into the magnet insertion holes 15 in the rotor core 12 while applying magnetic fluxes into the gate 77. Because the bonded-magnet material existing in the gates 77 before being injected into the magnet insertion holes 15 has high temperature and high flowability, the bonded magnets can be effectively magnetized by applying magnetic fluxes into the gates. This enables the bonded magnets 13 having a high orientation rate and a high magnetization rate to be molded into the rotor core 12, and thus output torque of a motor can be increased.

(2) The injection molding device 21 is provided with the magnetizing mechanism 23 that can accommodate the rotor core 12, and the magnetizing mechanism 23 is configured to apply magnetic fluxes to the rotor core 12. Thus, the bonded-magnet material after being injected into the magnet insertion holes 15 in the rotor core 12 can be oriented and magnetized.

(3) Each magnetic-flux applying member 73 is made of ferromagnetic material, and the side surface 73a thereof is arranged to face the magnetic-path surface 41a of the corresponding yoke 41 to serve as a magnetic path of magnetic fluxes of the magnetizing mechanism 23. This allows the magnetic fluxes of the magnetizing mechanism 23 to be applied into the gate 77.

During injection of a bonded-magnet material, the temperature of the injection die 63 easily becomes high due to influence of heat of the bonded-magnet material. Thus, for example, when permanent magnets are used to apply magnetic fluxes into the gates 77, the temperature of the injection die 63 and the temperature of the magnetic-flux applying member 73 become high, resulting in reduction of the magnetic fluxes applied into the gates 77. In contrast, the magnetizing mechanism 23 is not in direct contact with a molten bonded-magnet material, and thus the temperature thereof will not easily become high during injection of the bonded-magnet material when compared with the temperature of the injection die 63. Thus, magnetic fluxes generated by the magnetizing mechanism 23 are applied into the gates 77 via the magnetic-flux applying members 73, whereby reduction of the magnetic fluxes applied into the gates 77 during injection can be prevented in comparison with, for example, when permanent magnets are used.

(4) The cylindrical protruding portion 72 is formed at an end surface of the injection die 63 in which the gates 77 are open, and the magnetic-flux applying members 73 are embedded therein such that the side surfaces 73a are exposed at the outer peripheral surface of the protruding portion 72. The magnetizing mechanism 23 is formed in an annular shape that can accommodate, inside the inner periphery thereof, the rotor core 12 and the distal end portion of the protruding portion 72, and is arranged to face the side surfaces 73a in the radial direction. This enables the magnetic-flux applying members 73 and the yokes 41 to face each other while preventing the injection molding device 21 from up sizing.

(5) The injection die 63 is formed such that the gates 77 are open at positions close to the outer periphery on the end surface of the protruding portion 72. Because of this arrangement, a bonded-magnet material is injected into a range that is close to the inner peripheral surface of the magnetizing mechanism 23 and in which the magnetic field is strong, and is accordingly influenced by the strong magnetic fluxes to be magnetized. Thus, the orientation rate and the magnetization rate of the molded bonded magnets 13 can be further increased.

(6) A plurality of bonded magnets 13 are injection molded such that each gate mark 16 is arranged over the bonded magnets 13 on one end surface of the rotor 1. Because of this arrangement, the bonded-magnet material is injected from one gate 77 to a plurality of magnet insertion holes 15. This eliminates the need of arranging adjacent magnet insertion holes 15 so as to be apart from each other depending on the distance between adjacent gates 77, and thus flexibility in designing the rotor 1 can be improved.

The above-described embodiment can be implemented in the following modes in which this embodiment is appropriately modified.

In the present embodiment, by providing a heater to the upper die 26, the need of removing bonded magnets remaining in flow channels every time the bonded magnets 13 are injection molded in one rotor core 12 can be eliminated.

In the present embodiment, the respective magnetic-flux applying members 73 are embedded in the protruding portion 72 in a manner sandwiching each gate 77 from both sides in the circumferential direction. However, the present invention is not limited to this. For example, the respective magnetic-flux applying members 73 may be embedded in the protruding portion 72 in a manner sandwiching each gate 77 from both sides in the radial direction. As long as magnetic fluxes can be applied into the gates 77 from the magnetic-flux applying members 73, arrangement of the magnetic-flux applying members 73 in the injection die 63 may be changed as appropriate. Each of the magnetic-flux applying members 73 and the fixing holes 78 may be formed in a triangular shape, for example, and also the number and the shape of these may be changed as appropriate. Similarly, for example, the number and the arrangement of the gates 77 may be changed as appropriate.

In the present embodiment, the side surface 73a of each magnetic-flux applying member 73 faces the magnetic-path surface 41a of the corresponding yoke 41 in the radial direction. However, the present invention is not limited to this. For example, the injection die 63 may be configured such that the magnetic-flux applying members 73 are exposed at the end surface of the protruding portion 72 and the protruding portion 72 is larger than the bore diameter of the magnetizing mechanism 23, and each magnetic-flux applying member 73 may be arranged to face the corresponding yoke 41 in the axial direction.

In the present embodiment, the magnetic-flux applying members 73 containing ferromagnetic material are configured as a magnetic-flux applying unit. However, the present invention is not limited to this. For example, the permanent magnets 42 may be configured as the magnetic-flux applying unit. In this case, the magnetic-flux applying unit does not have to face part of the magnetizing mechanism 23 to serve as a magnetic path of magnetic fluxes of the magnetizing mechanism 23.

Furthermore, an electromagnetic coil may be configured as the magnetic-flux applying unit, and the electromagnetic coil may be provided to the injection die 63. In this case, when the bonded magnets 13 are injection molded, a molten bonded-magnet material is injected into the magnet insertion holes while electricity is supplied to the electromagnetic coil to apply magnetic fluxes into the gates 77.

In the present embodiment, the magnetizing mechanism 23 is configured by arranging a plurality of yokes 41 and a plurality of permanent magnets 42 in an annular shape. However, the present invention is not limited to this. For example, an electromagnetic coil may be used in place of the permanent magnets 42, and the configuration thereof may be changed as appropriate.

In the present embodiment, the bonded magnets 13 may be magnetized only by magnetic fluxes applied into the gates 77 without providing the magnetizing mechanism 23 to the injection molding device 21.

In the present embodiment, the cross-section of each magnet insertion hole 15 has an arc shape that protrudes radially inward. However, the present invention is not limited to this. For example, the cross-section of each magnet insertion hole 15 may have a linear shape orthogonal to the radial direction or may have a truncated chevron shape or the like, and the shape thereof may be changed as appropriate.

In the present embodiment, the magnet insertion holes 15 only need to be open to at least one side in the axial direction.

In the present embodiment, the injection die 63 and the rotor core 12 are designed such that each gate mark 16 is formed over a plurality of bonded magnets 13 (magnet insertion holes 15). However, the present invention is not limited to this. The gate mark 16 may be formed on each single bonded magnet 13.

In the present embodiment, the rotor core 12 is used as a target object in which the bonded magnets 13 are to be injection molded. However, the present invention is not limited to this. For example, the target object in which the bonded magnets 13 are to be injection molded may be changed as appropriate to a movable element of a linear motor or a magnet sensor.

The following additionally describes technical ideas that can be understood from the present embodiment and other examples, together with the effects thereof.

(a) In the bonded-magnet injection molding device, the gates are open at positions close to the outer periphery on the end surface of the protruding portion. By this configuration, a bonded-magnet material is injected into a range that is close to the inner peripheral surface of the magnetizing mechanism and in which the magnetic field is strong, and is accordingly influenced by the strong magnetic fluxes to be magnetized. Thus, the orientation rate and the magnetization rate of the molded bonded magnets can be satisfactorily increased.

(b) A rotor includes: a columnar rotor core having a plurality of magnet insertion holes that are open to at least one side in the axial direction; and bonded magnets provided in the respective magnet insertion holes. On an end surface of the rotor core on an open side of the magnet insertion holes, gate marks are formed so as to be each arranged over the bonded magnets. According to the above-described configuration, each gate mark is arranged over the bonded magnets. Because of this arrangement, the bonded-magnet material is injected from one gate to a plurality of magnet insertion holes. This eliminates the need of arranging adjacent magnet insertion holes so as to be apart from each other depending on the distance between adjacent gates, for example, and thus flexibility in designing the rotor can be improved.

According to the present invention, the magnetization rate of the bonded magnets can be increased.

What is claimed is:

1. A bonded-magnet injection molding device comprising:
   an injection die in which a gate through which a molten bonded-magnet material is injected into a magnet insertion hole in a rotor core is formed, and
   a magnetizing mechanism that applies a magnetic flux to the rotor core to magnetize the bonded-magnet material injected into the magnet insertion hole, wherein
   the injection die is provided with a magnetic-flux applying unit that applies a magnetic flux into the gate,
   the injection die has a protruding portion at an end surface in which the gate is open,
   the magnetic-flux applying unit is arranged in the protruding portion such that a side surface of the magnetic-flux applying unit is exposed at an outer peripheral surface of the protruding portion, and
   the magnetizing mechanism is formed in an annular shape capable of accommodating, inside an inner periphery of the magnetizing mechanism, the rotor core and part of the protruding portion, and radially faces the side surface.

2. The bonded-magnet injection molding device according to claim 1, wherein
   the magnetic-flux applying unit is made of ferromagnetic material, and faces part of the magnetizing mechanism to serve as a magnetic path of the magnetic flux of the magnetizing mechanism, thereby applying the magnetic flux of the magnetizing mechanism into the gate.

3. A bonded-magnet injection molding method comprising:
   injecting, through the gate of the injection die of the bonded-magnet injection molding device of claim 1, the molten bonded-magnet material into the magnet insertion hole in the rotor core while applying a magnetic flux into the gate.

* * * * *